US005927794A

United States Patent [19]

Möbius et al.

[11] Patent Number: 5,927,794

[45] Date of Patent: Jul. 27, 1999

[54] OPERATING DEVICE FOR UNLOCKING AT LEAST ONE SWIVELLABLE LID OF A VEHICLE, PARTICULARLY A MOTOR VEHICLE

[75] Inventors: Wolfgang Möbius, Schwieberdingen; Hans Droste, Leonber, both of Germany

[73] Assignee: Dr. Ing. h.c.F. Porsche AG, Weissach, Germany

[21] Appl. No.: 08/762,805

[22] Filed: Dec. 9, 1996

[30] Foreign Application Priority Data

Dec. 9, 1995 [DE] Germany ........................... 195 46 063

[51] Int. Cl.[6] ........................................................ B60J 1/08

[52] U.S. Cl. .................................... 296/146.1; 296/65.17; 296/76; 296/65.01; 701/49; 292/DIG. 14

[58] Field of Search ............................. 296/146.1, 146.4, 296/65.17, 39.1, 76, 65.01; 180/69.21; 70/256, 239; 701/49; 292/DIG. 14, DIG. 43, DIG. 3, DIG. 5

[56] References Cited

U.S. PATENT DOCUMENTS

| | | | |
|---|---|---|---|
| 4,099,593 | 7/1978 | Schultz . | |
| 4,756,562 | 7/1988 | Foster et al. | 292/DIG. 14 |
| 4,797,824 | 1/1989 | Suglyama et al. | 296/65 |
| 4,872,366 | 10/1989 | Appleby . | |
| 4,962,955 | 10/1990 | Ferrara et al. | 292/DIG. 43 |
| 5,054,826 | 10/1991 | Dow et al. . | |
| 5,253,917 | 10/1993 | Brueggemann | 296/224 |
| 5,475,592 | 12/1995 | Wnuk et al. | 364/424.05 |
| 5,535,608 | 7/1996 | Brin | 70/256 |
| 5,748,473 | 5/1998 | Breed et al. | 364/424.055 |

FOREIGN PATENT DOCUMENTS

| | | |
|---|---|---|
| 486055 | 11/1929 | Germany . |
| 0529288A1 | 3/1993 | Germany . |
| 4329997A1 | 3/1995 | Germany . |

OTHER PUBLICATIONS

Search Report, Mar. 11,1997, Germany.

*Primary Examiner*—D. Glenn Dayoan
*Assistant Examiner*—Long Bao Nguyen
*Attorney, Agent, or Firm*—Evenson McKeown Edwards & Lenahan, PLLC

[57] ABSTRACT

An operating device for unlocking at least one swivellable lid of a vehicle, particularly a motor vehicle, is arranged on the interior side of a side member and comprises a bearing housing and at least one swivellable operating grip. For achieving an operating device which can be manufactured and mounted in a simple manner and at reasonable cost and for achieving an effective protection against theft, it is provided that the bearing housing is constructed in one piece with an elongated interior side member panel and in that the at least one swivellable operating grip has a molded-on part on its free ends which points to the exterior side of the vehicle and which, when the vehicle door is closed, reaches in sections under an interior door covering such that a swivelling-up of the operating grip and thus an unlocking of the lid is prevented.

26 Claims, 6 Drawing Sheets

OPERATING DEVICE FOR UNLOCKING AT LEAST ONE SWIVELLABLE LID OF A VEHICLE, PARTICULARLY A MOTOR VEHICLE

BACKGROUND AND SUMMARY OF THE INVENTION

This invention relates to an operating device for unlocking at least one swivellable lid of a vehicle, particularly a motor vehicle.

From German Patent Document DE 43 29 997 A1, corresponding to U.S. Pat. No. 5,535,608, issued Jul. 16, 1996 an operating device for unlocking at least one swivellable lid of a vehicle, particularly a motor vehicle, is known which functions well and in the case of which the two swivellable operating grips are rotatably disposed on a common housing. The housing is mounted on the interior side of the side member. In this arrangement, a cylinder lock is arranged between the two operating grips in the housing in order to prevent an unintended opening of the lids when the vehicle is open and the cylinder lock is locked (protection against theft). In this arrangement, the forward operating grip is assigned to the rearward lid and the rearward operating grip is assigned to the forward lid.

It is an object of the invention to further develop an operating device of the initially mentioned type such that it can be manufactured and mounted in a simple manner and at reasonable cost, in which case the expenditures for achieving a protection against theft can be reduced. In addition, the operating device must harmonically match the interior fittings of the vehicle, and an ergonomically improved operating device is to be provided.

According to the invention, this object is achieved by providing an operating device for unlocking a swivellable lid of a motor vehicle, comprising a manually operable swivellable operating grip configured with a portion engageable under a vehicle side door such as to only be operable to open a lid when the door is open.

An advantage of the operating device according to the invention is that the doors serve to lock the system and obviate the need for a separate lock.

Principal advantages achieved by means of especially preferred embodiments of the invention are that, as a result of the integration of the housing of the operating device into an elongated interior side member panel, a reduction of the required components takes place whereby a simple manufacturing and mounting is achieved at reasonable cost.

In an ergonomically advantageous manner, the operating device is arranged within the reach of the driver's seat and has a construction which is logical for the user; that is, when the forward operating grip is operated, the forward lid is unlocked. The same applies to the rearward operating grip which is assigned to the rearward lid.

Furthermore, the interior side member panel with the integrated operating device harmonically matches the interior fittings of the vehicle.

The outward-projecting moldings to the free ends of the operating grips cause an effective protection against theft at reasonable cost because they reach in sections below the adjoining vehicle door or its interior panelling, whereby a swivelling-up of the operating grips is possible only when the door is open. An expensive lock inside the housing as a protection against theft is therefore not necessary.

In their inoperative position, the two operating grips extend flush with the surface of the adjoining sections of the side member panel so that a vehicle occupant, when entering the vehicle, cannot catch on the operating grips or damage them. The grip recesses on the side member panels which are accessible from the interior side facilitate the swivelling-up of the operating grips during the unlocking of the lid.

In addition, a receiving space into which a switch unit can be placed is provided on the side member panel on the side facing the passenger compartment. The switch unit comprises several memory switches as well as at least one storage unit in order to be able to call with the pressing of a button the desired seat position of an electrically adjustable seat for different seat users. The switch unit can be operated also when the door is closed and is arranged laterally in the interior next to the two operating grips. The side member panel has a symmetrical construction and can therefore be used for left and right steering vehicles.

Other objects, advantages and novel features of the present invention will become apparent from the following detailed description of the invention when considered in conjunction with the accompanying drawings.

DETAILED DESCRIPTION OF THE INVENTION

Figure 1:
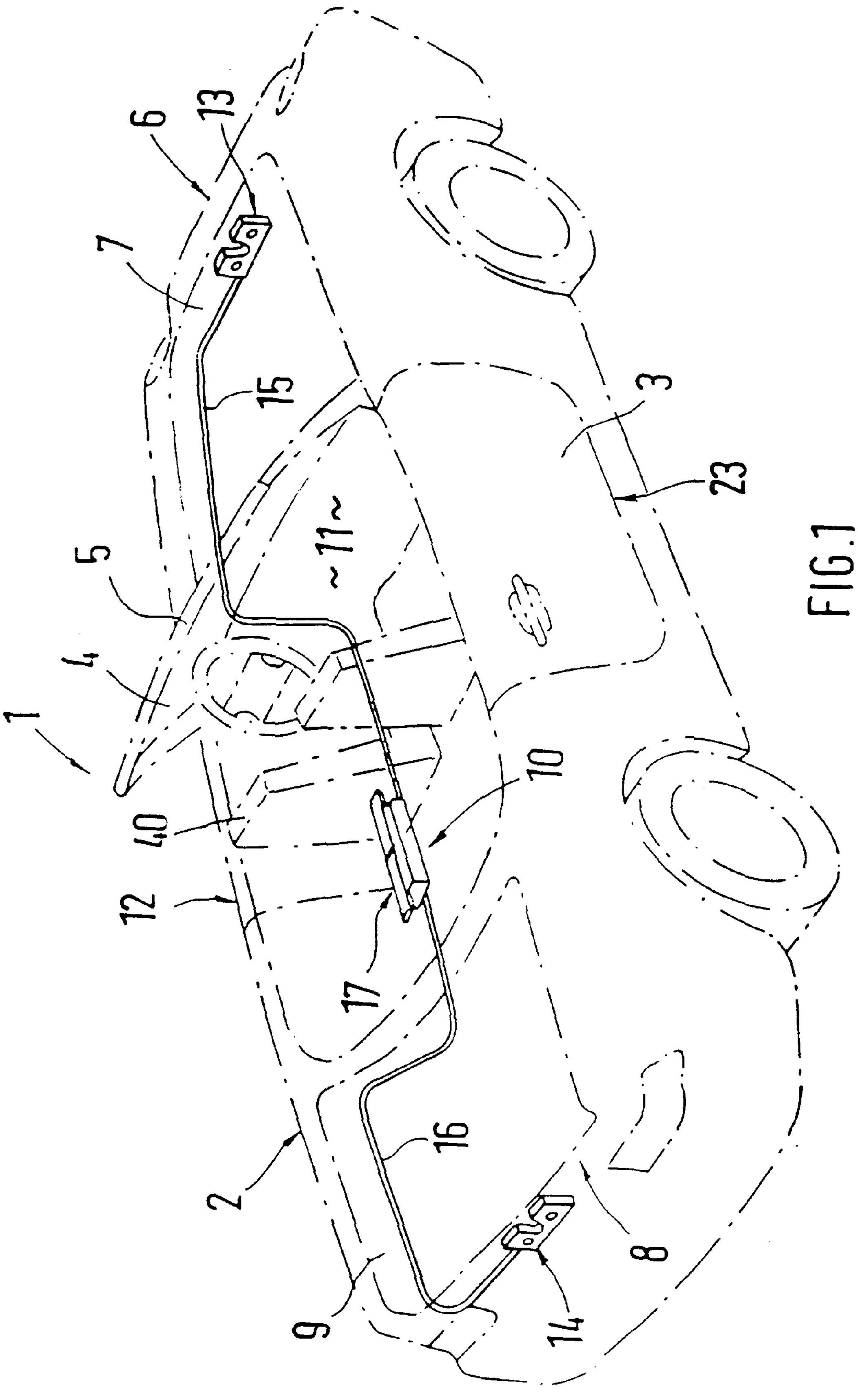
FIG. 1 is a perspective view diagonally from behind of a passenger car with an open body and a operating device for unlocking and locking at least two spaced hoods, constructed according to a preferred embodiment of the invention.

FIG. 1 illustrates a motor vehicle 1 which is an open convertible whose body 2 has side doors 3, a windshield frame 5 accommodating a windshield 4, a first lid 7 arranged in the forward area 6 as well as a second lid 9 provided in the rearward area 8. For unlocking and locking the two swivellable lids 7, 9, a device 10 is provided which can be operated from a passenger compartment 11 of the motor vehicle 1 which is open above a belt line 12. A conventional lock 13, 14 is assigned to each hood 7, 8, in which case each lock 13, 14 is connected by way of a connection element 15, 16 with a common operating device 17. In the embodiment shown, the connection elements 15, 16 are formed by Bowden cables. However, they may also be constructed as linkages or the like.

Figure 2:
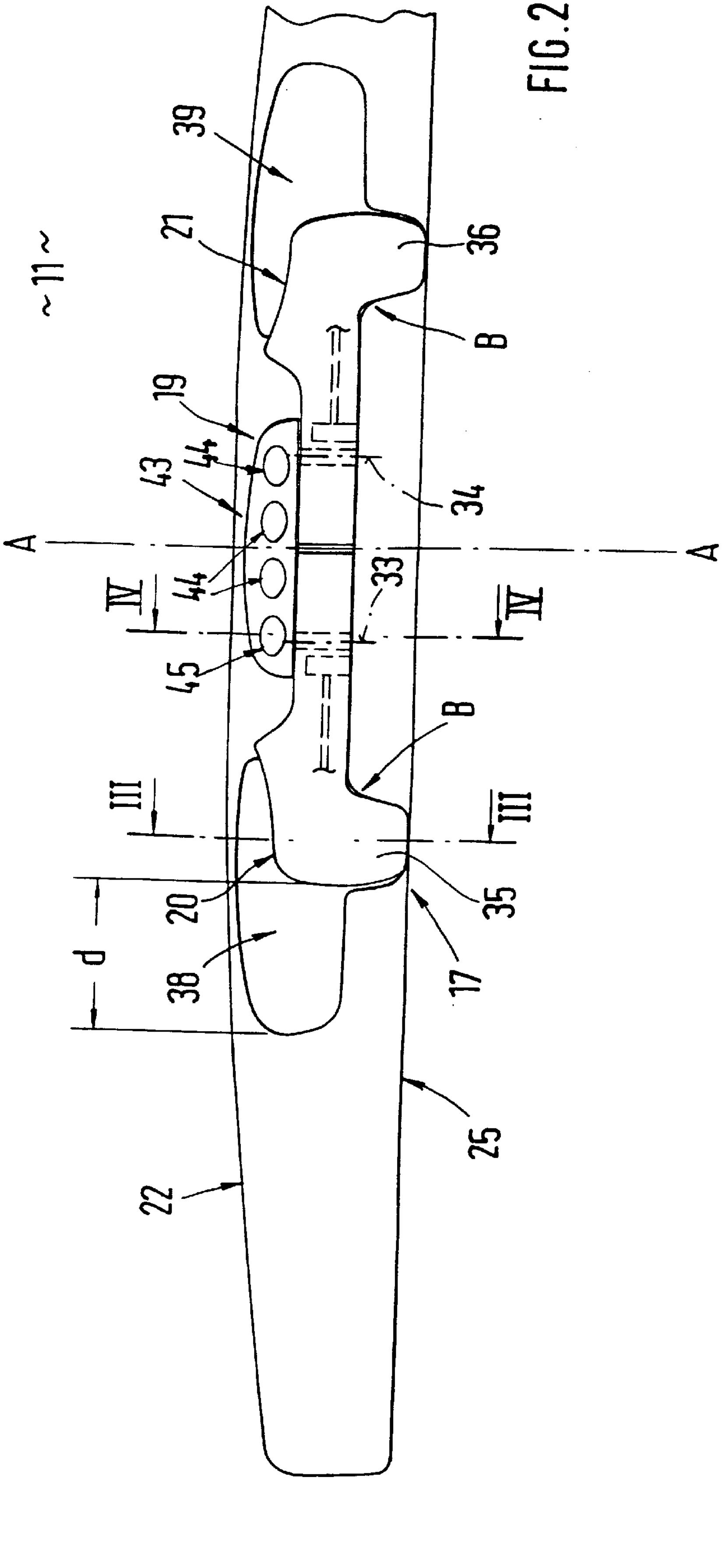
FIG. 2 is a top view of the common operating device.
Figure 3:
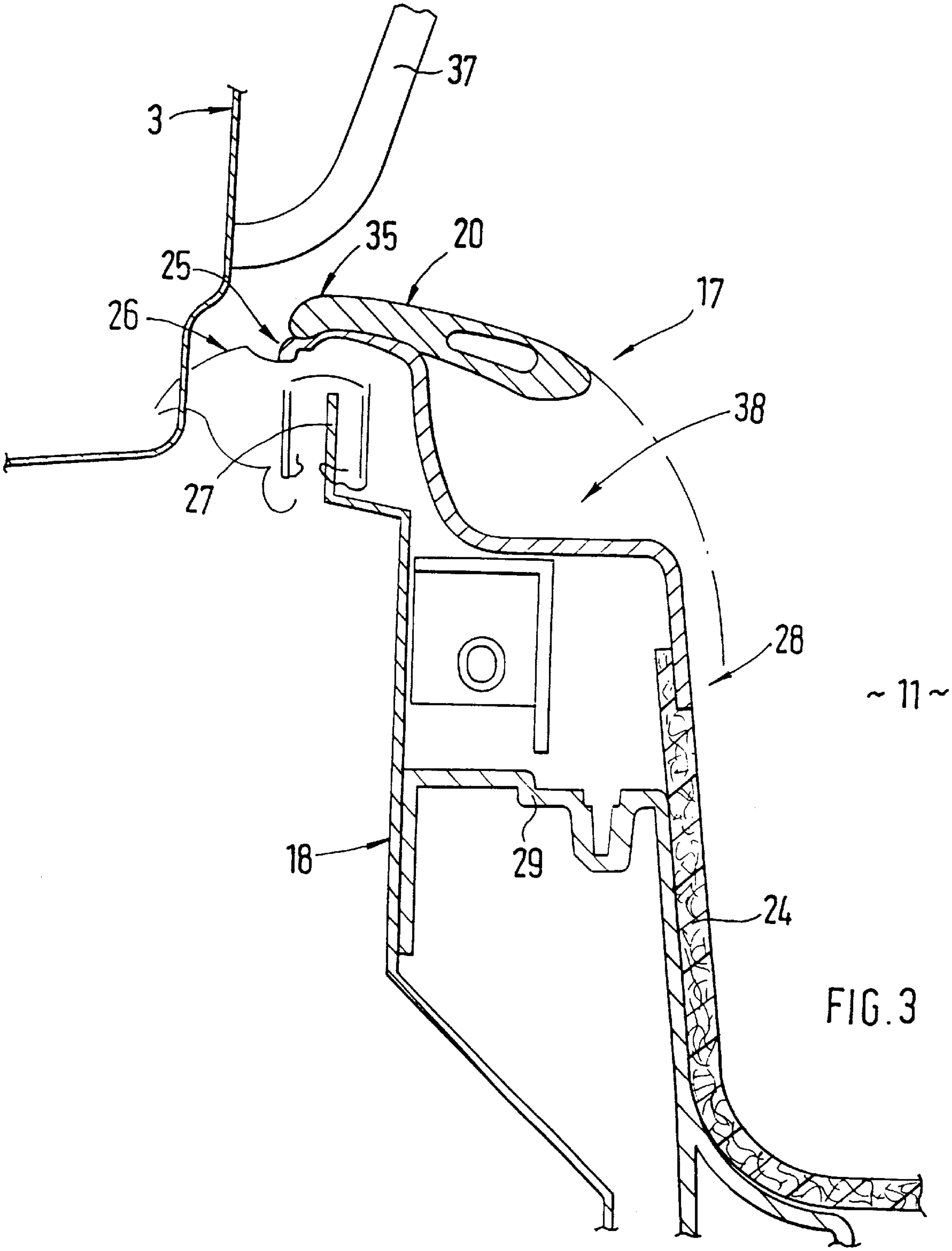
FIG. 3 is an enlarged sectional view taken along Line III—III of FIG. 2.
Figure 4:
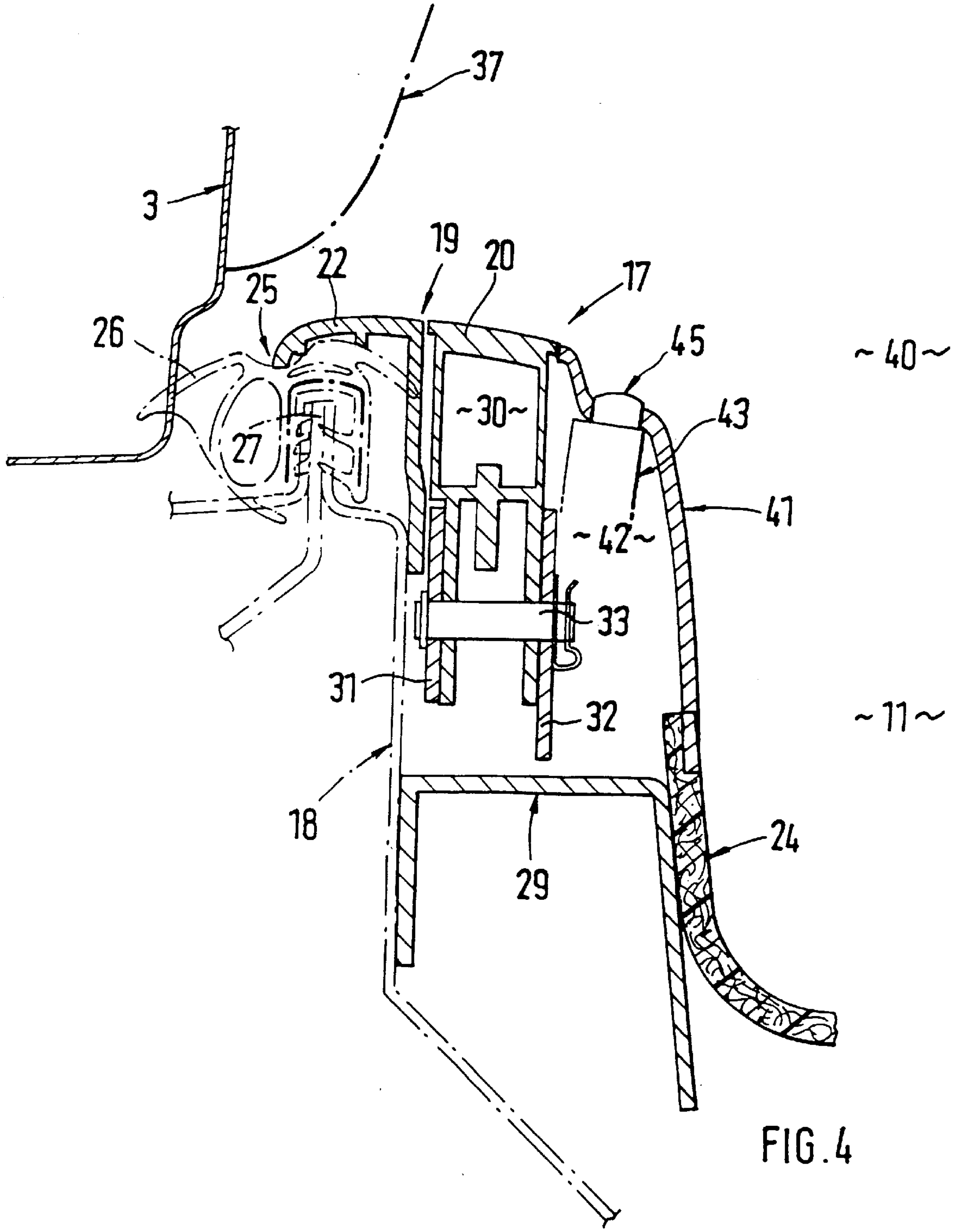
FIG. 4 is an enlarged sectional view taken along Line IV—IV of FIG. 2.
Figure 5:
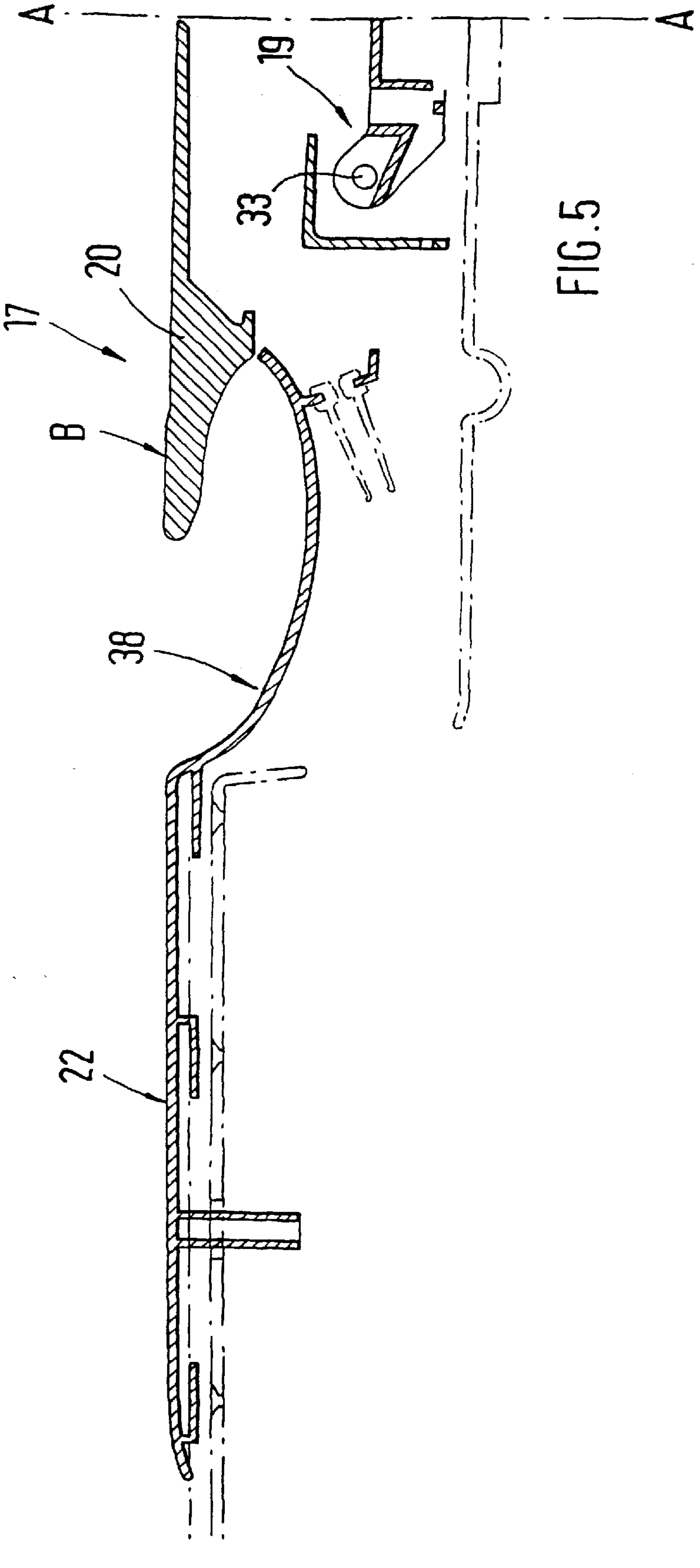
FIG. 5 is an enlarged sectional view taken along Line V—V of FIG. 2.

The common operating device 17 is mounted on the side of a laterally exterior side member 18 which faces the passenger compartment 11 and comprises a bearing housing 19, which accommodates the operating grips 20, 21 for the lids 7, 8 (FIGS. 2 to 4).

According to the invention, the bearing housing 19 is constructed in one piece with an elongated interior side member panel 22. The interior side member panel 22 extends along a significant portion of the longitudinal course of a lower door opening 23, in which case the bearing housing 19 is constructed approximately in a center area of the longitudinal course of the side member panel 22.

According to FIGS. 3 and 4, the interior side member panel 22 covers a partial area of the top side of the side member 18 and a partial area of the upright interior lining 24 which faces the passenger compartment 11, the interior lining 24 being formed by a carpeted floor. The exterior edge 25 of the interior side member panel 22 which faces the door 3 rests on a door sealing profile 26 which is fastened on the side-member-side and which is fitted onto a flange 27 of the side member 18 extending in the longitudinal direction of the vehicle.

The edge 28 of the profiled side member panel 22, which laces the passenger compartment 11 and is pulled downward, rests on the lateral carpeted floor under prestress. The side member panel 22 rests locally on a supporting part 29 disposed underneath and is detachably fastened on it. In the area of the two elongated operating grips 20, 21, the side member panel 22 has a duct-shaped receiving section 30 which is pulled downward and which forms the bearing housing 19. Both operating grips 20, 21 are disposed adjacent to a transversely extending plane of symmetry A—A of the side member panel 22 on spaced walls 31, 32 of the duct-shaped receiving section 19 so that they can be swivelled about horizontal, transversely extending axes of rotation 33, 34. Viewed in the longitudinal direction of the vehicle, the two operating grips 20, 21 are arranged behind one another on the side member panel 22, in which case the free ends of the operating grips 20, 21 point in opposite directions.

For ergonomic reasons, the operating grip 20 which is in front viewed in the driving direction is assigned to the forward lid 7 and the rear operating grip 21 is assigned to the rearward lid 8.

According to the invention, each operating grip 20, 21 has on this free end facing away from the plane of symmetry A—A a molded-on part 35, 36 which points to the exterior side of the vehicle and which, when the side door 3 is closed, reaches in sections under an interior door covering 37. As a result, when the door 3 is closed and locked, a swivelling-up of the operating grips 20, 21 and therefore an unlocking of the lids 7, 9 is prevented.

On the side member panel 22, in the area of the molded-on part 35, 36 of each operating grip 20, 21 which extends approximately at a right angle to the elongated side member panel, a downward-directed depression is provided which is adapted to the contour of the molded-on part 35, 36.

Each molded-on part 35, 36 closes off approximately flush with the exterior edge 25 of the side member panel 22.

Adjacent to the free ends of the operating grips 20, 21, on the side of the side member panel 22 facing the adjoining seat 40, grip recesses 38, 39 are shaped out which are accessible from the interior, in order to ensure a good handling of the operating grips 20, 21.

Figure 6:
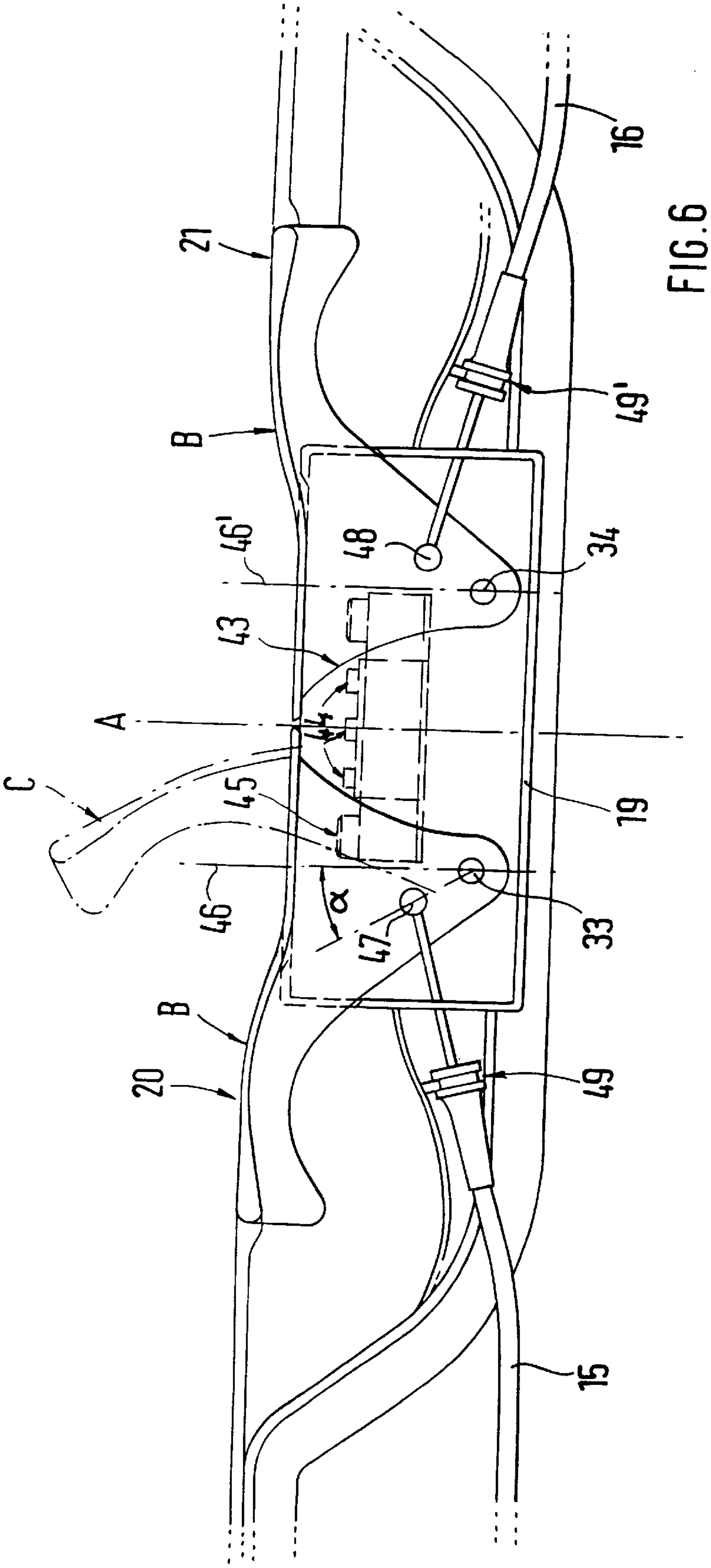
FIG. 6 is a lateral view of the operating device.

In their approximately horizontal inoperative positions B, the two operating grips 20, 21 extend flush with the surface with respect to the adjoining sections of the side member panel 22. For unlocking the lid 7, 9, when the door 3 is open, the operating grips 20, 21 are swivelled upward into an operative position C (FIG. 6). The transversely extending depressions lead on the interior side into the adjoining grip recesses 38, 39. The grip recesses 38, 39 project over the operating grips 20, 21 toward the front or rear by an extent "d".

Between the two grip recesses 38, 39, the side member panel 22 has, on the side facing the seat 40, a pulled-up section 41 under which a receiving space 42 for a switch unit 43 is provided. The switch unit 43 comprises several memory switches 44 and at least one storage unit 45 for at least one electrically adjustable seat.

In the embodiment shown, the switch unit 43 has three memory switches; that is, for three different seat users, the stored, previously correctly adjusted seat position is called with the pressure of a button and is then automatically adjusted.

If no switch unit 43 is placed in the receiving space 41, this receiving space 41 can be covered in the upward direction by a blind covering which is not shown in detail.

In the top view, the side member panel 22 has a larger width in the center area of its longitudinal course. On the side facing the passenger compartment 11, the side member panel 22 tapers a little toward the two ends. The side member panel 22 is constructed symmetrically with respect to the transversely extending plane of symmetry A—A and can be used for vehicles steered on the left as well as on the right. The switch unit 43 is also constructed symmetrically with respect to the plane of symmetry A—A.

Instead of the operating device 17, a trough-shaped depositing receptacle can be integrated in the side member panel 22. In addition, the upper exterior area of the side member 18 can be covered at least in sections by another panel.

The linking of the connection elements 15, 16 to the operating grips 20, 21 takes place above the axes of rotation 33, 34 and by an angle $\alpha$ of approximately 30° offset with respect to a vertical plane 46, 46' extending through the axis of rotation 33, 34, at 47, 48.

An end of the Bowden cable cover facing the operating device 17 is held in position at 49, 49' on a holding web 50, 50' of the bearing housing 19.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Operating device for unlocking at least one swivellable lid of a vehicle, particularly a motor vehicle, which is arranged on the interior side of a vehicle side member adjacent a vehicle door and comprises a bearing housing and at least one swivellable operating grip, wherein the bearing housing is constructed in one piece with an elongated interior side member panel, and wherein the at least one swivellable operating grip has a molded-on part which has a free end pointing to an exterior side of the vehicle and which, when a vehicle door is closed, extending under an interior door covering such that a swivelling-up of the operating grip and thus an unlocking of the lid is prevented when the vehicle door is closed.

2. Operating device according to claim 1, wherein the operating device has front and rear operating grips, the front operating grip being assigned to a forward lid and the rear operating grip being assigned to a rearward lid.

3. Operating device according to claim 1, wherein the operating grip is operably swivellable from an approximately horizontal inoperative position into a swivelled-up operative position only when the vehicle door is open.

4. Operating device according to claim 2, wherein the operating grips are operably swivellable from an approximately horizontal inoperative position into a swivelled-up operative position only when the vehicle door is open.

5. Operating device according to claim 1, wherein, on the interior side member panel, on a side facing a passenger compartment, a receiving space is provided laterally next to bearing sections for the operating grip, a switch unit being inserted in the receiving space which can be operated also when the door is closed.

6. Operating device according to claim 4, wherein, on the interior side member panel, on a side facing a passenger compartment, a receiving space is provided laterally next to bearing sections for the operating grip, a switch unit being inserted in the receiving space which can be operated also when the door is closed.

7. Operating device according to claim 5, wherein the switch unit has several memory switches and at least one storage unit for at least one electrically adjustable seat.

8. Operating device according to claim 6, wherein the switch unit has several memory switches and at least one storage unit for at least one electrically adjustable seat.

9. Operating device according to claim 1, wherein the interior side member panel covers a partial area of a top side of the vehicle side member and a partial area of an upright interior covering facing the passenger compartment.

10. Operating device according to claim 4, wherein the interior side member panel covers a partial area of a top side of the vehicle side member and a partial area of an upright interior covering facing the passenger compartment.

11. operating device according to claim 1, wherein the interior side member panel rests in sections on and is detachably held in position on a supporting part situated underneath and fastened to the vehicle side member.

12. operating device according to claim 9, wherein the interior side member panel rests in sections on and is detachably held in position on a supporting part situated underneath and fastened to the vehicle side member.

13. Operating device according to claim 10, wherein the interior side member panel rests in sections on and is detachably held in position on a supporting part situated underneath and fastened to the vehicle side member.

14. Operating device according to claim 1, wherein grip recesses are constructed on the interior side member panel on a side facing an adjoining seat in an area of free ends of the operating grip.

15. Operating device according to claim 4, wherein grip recesses are constructed on the interior side member panel on a side facing an adjoining seat in an area of free ends of the operating grips.

16. Operating device according to claim 6, wherein grip recesses are constructed on the interior side member panel on a side facing an adjoining seat in an area of free ends of the operating grips.

17. Operating device according to claim 1, wherein the side member panel has corresponding depressions in an area of end-side molded-on parts of the operating grip.

18. Operating device according to claim 4, wherein the side member panel has corresponding depressions in an area of end-side molded-on parts of the operating grips.

19. Operating device according to claim 1, wherein the operating grip extends flush with the surface with respect to adjoining sections of the side member panel when in an approximately horizontal inoperative position.

20. Operating device according to claim 4, wherein the operating grips extend flush with the surface with respect to adjoining sections of the side member panel when in an approximately horizontal inoperative position.

21. Operating device according to claim 18, wherein the operating grips extend flush with the surface with respect to adjoining sections of the side member panel when in an approximately horizontal inoperative position.

22. Operating device for unlocking a swivellable lid of a motor vehicle, comprising:

at least one manually operable swivellable operating grip configured with a portion engageable under a vehicle side door such as to only be operable to open a lid when the door is open, wherein said operating grip is pivotally supported in a bearing housing which is formed integrally with an elongated interior side member panel which includes an upwardly open depression for accommodating said grip.

23. Operating device according to claim 22, further comprising a seat positioning switch assembly housed in the interior side member and disposed to be operably accessible with said door in both closed and open position.

24. Operating device according to claim 22, wherein two of said operating grips are provided for in said side member, one for a forward vehicle lid and one for a rearward vehicle lid.

25. Operating device according to claim 23, wherein two of said operating grips are provided for in said side member, one for a forward vehicle lid and one for a rearward vehicle lid.

26. Operating device according to claim 24, wherein the operating grips are operably swivellable from an approximately horizontal inoperative position into a swivelled-up operative position only when the vehicle door is open.

* * * * *